UNITED STATES PATENT OFFICE.

WILLIAM QUANN, OF PHILADELPHIA, PENNSYLVANIA, ASSIGNOR TO HIMSELF AND WM. N. & JOS. H. TAYLOR, ASSIGNORS TO WM. QUANN, WM. N. TAYLOR, AND LATHROP & WETMORE.

IMPROVED PROCESS FOR THE REDUCTION OF IRON ORE.

Specification forming part of Letters Patent No. 33,020, dated August 6, 1861.

*To all whom it may concern:*

Be it known that I, WILLIAM QUANN, of the city and county of Philadelphia, and State of Pennsylvania, have invented a new and Improved Process for the Reduction of Iron from the Ore; and I do hereby declare that the following is a full, clear, and exact description of the same.

The nature of my invention consists in an improved process for the reduction of iron from the ore by the use of solutions of wood-ashes, pulverized charcoal, carbonate of ammonia, a fixed oil, and common salt, mixed in the proportions and used in the manner hereinafter described.

By employing carbonaceous and oleaginous substances as reducing agents, and ammoniacal and other salts volatile in the fire, in the manner hereinafter set forth, the impurities in the iron are freed and carried off, so as to highly improve the quality and value of the metal thus obtained, and I am thereby enabled to render red-hot iron equal to the best iron required in the arts, and this without any admixture of scrap-iron or high-priced pig.

The solution used in my improved process consists of the following ingredients mixed in the proportions stated—the quantities named are calculated to answer for the smelting of one ton of iron ore: wood-ashes, one quart; powdered charcoal, fifteen pounds; carbonate of ammonia, three and a half pounds; lamp-oil, two quarts; saturated solution of common salt, two quarts.

The ashes and fixed oil forming part of my solution constitute a very powerful flux, the oil as it is charred by heat yielding a finely-divided charcoal, which mingles intimately with the alkali. The common salt, which contains about forty-two per cent. of soda, assists the action of the alkali in eliminating impurities. Sand may be added to aid in the formation of an easily-flowing cinder. The volatile parts of the oil, the charred mass it yields, and the pulverized charcoal combine to intensify the combustion and expel sulphur in the form of sulphides of carbon. The volatilizing action of the solution is also assisted by the carbonate of ammonia, which, when liberated, carries the phosphorus and arsenic off with them. The solution therefore possesses the combined properties of an effective flux and volatilizer. This solution ought to be mixed with an incombustible absorbent—such as pulverized iron ore, for instance. This powder will take up a large quantity of the solution, and when it has done so the ore is well mixed with it. After the expiration of a certain time— say twelve hours—the ore will be found sufficiently acted upon by the solution, and is then placed in the furnace and subjected to heat.

To obtain refined cast-iron the process is completed in a cupola-furnace.

By means of the described solution and process I am enabled to smelt iron directly from the ore. The ore powdered and made to absorb the solution when placed in a suitable furnace is readily reduced to the metallic state.

It will be seen that the main feature of my invention is that by the action of the above solution and heat combined the fixed impurities are made to rise and float on the surface of the melting mass in the form of slag or cinder, while the volatile impurities pass up the flue, aided and accompanied by the elastic vapors which are liberated by the action of heat on said solution, whereby the effects set forth in this specification are obtained.

What I claim as my invention, and desire to secure by Letters Patent, is—

An improved process for the reduction of iron from the ore, consisting in the use of solutions of wood-ashes, pulverized charcoal, carbonate of ammonia, a fixed oil, and common salt, mixed in the proportions and used in the manner substantially as described.

WILLIAM QUANN.

Witnesses:
WM. P. HIBBIRD,
MARTIN MANGER.